March 31, 1931.  H. P. SPARKES  1,798,710
METER DEVICE
Original Filed Sept. 8, 1925
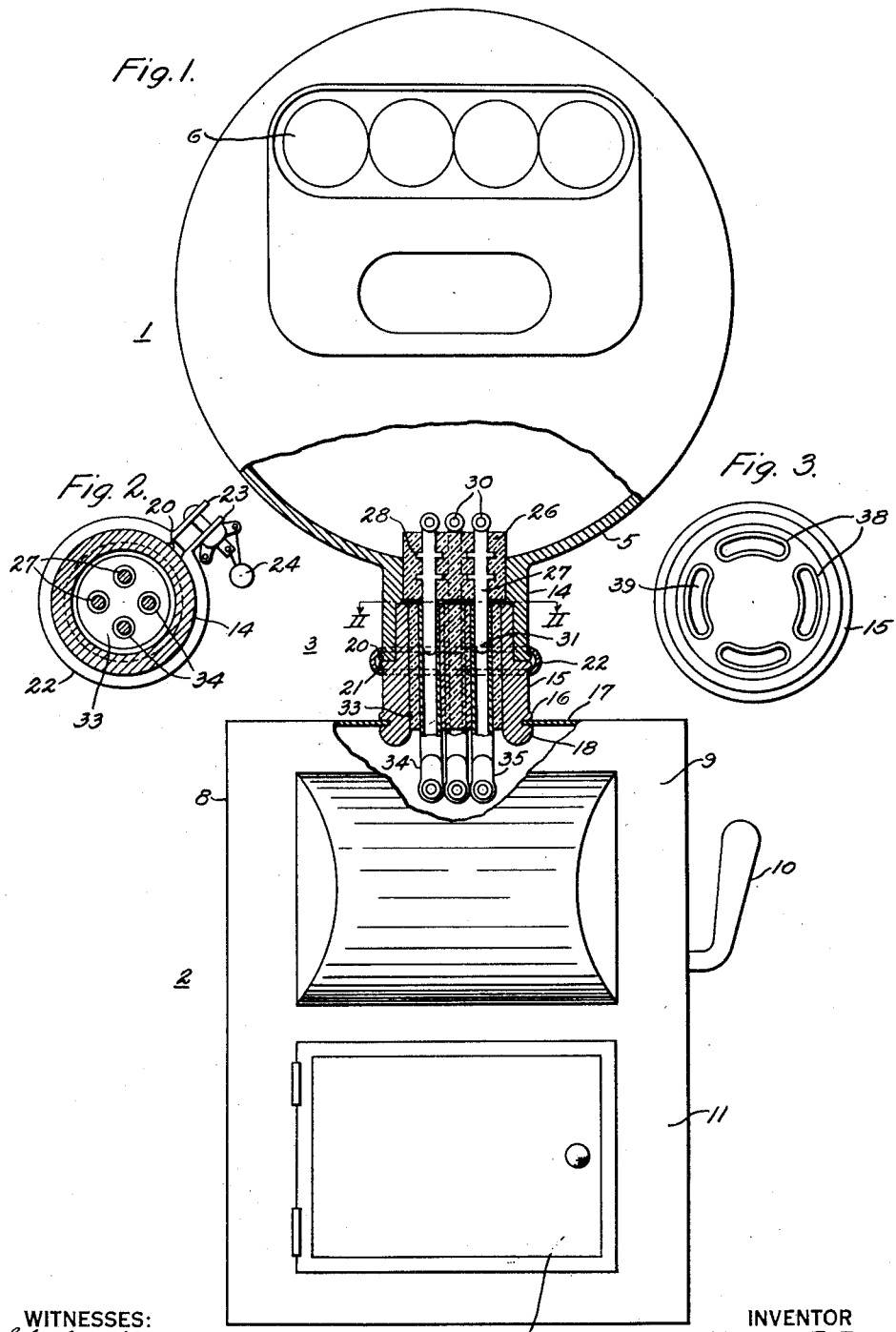
WITNESSES:
INVENTOR
Harry P. Sparkes.
BY
ATTORNEY Patented Mar. 31, 1931

1,798,710

UNITED STATES PATENT OFFICE

HARRY P. SPARKES, OF PITTSBURGH, PENNSYLVANIA, ASSIGNOR TO WESTINGHOUSE ELECTRIC AND MANUFACTURING COMPANY, A CORPORATION OF PENNSYLVANIA.

METER DEVICE

Application filed September 8, 1925, Serial No. 54,895. Renewed October 30, 1928.

My invention relates to meter devices and particularly to means for connecting watthour meters to fuse-and-switch boxes.

One object of my invention is to provide a device of the above-indicated character that small materially reduce the cost thereof.

Another object of my invention is to provide means whereby the connection of a meter to its co-operating box shall be greatly facilitated.

Another object of my invention is to provide a connector between a meter and a meter box that shall permit the meter and the box to be angularly adjustable.

Another object of my invention is to provide a meter-and-box connector that shall reduce the likelihood of theft of current.

A further object of my invention is to provide a meter-and-box device that shall be simple and durable in construction and effective in its operation.

In connection with the measurement of electrical energy, it has been usual to employ watthour meters and separate fuse-and-switch boxes connected thereto by insulated or armored flexible conducting leads. However, such connections have been effected between the boxes and watthour meters of a usual type having terminal compartments constituting integral parts thereof. In other words, the usual cylindrical rectangular meter casings have been provided with terminal compartments projecting therefrom and having sealed cover members.

With the above-mentioned terminal compartments, conductors lead from the meter windings to the binding posts and from the latter to the boxes, so that the conductors must be individually manipulated to complete the connection. It is my aim to eliminate the usual watthour meter terminal, to thereby materially reduce the cost of the meter, and to provide means whereby the meter may be quickly connected to its box, without the individual manipulation of the several leads. It is also my purpose to provide a rigid connector which shall permit the meter and the box to be adjusted angularly relative to each other, thereby preventing ready access to the conductors and compensating for discrepancies in the planes of the walls or surfaces upon which the meter and the box are to be mounted.

Figure 1 of the accompanying drawings is a front elevational view of a meter, a box and a connector constructed in accordance with my invention with parts broken away and omitted and other parts in section, Fig. 2 is a view taken along the line II—II of Fig. 1, and Fig. 3 is a view similar to Fig. 2 but on a different scale of a modified form of my invention.

Referring to Figs. 1 and 2, the device comprises, in general, a watthour meter 1, a box 2 for the reception of a switch, fuses or other apparatus (not shown) and a connector 3 between the meter 1 and the box 2.

The meter 1 and the box 2 are of a usual and a well-known type, except for the manner of attachment thereof to the connector 3, the meter comprising a casing 5, an integrating register 6 and other parts (not shown) and the box comprising a casing 8, a switch compartment 9, an operating handle 10 therefor and a fuse compartment 11 having a door 12.

The box 8 may be of the "safety" type in which the door 12 cannot be opened unless the handle 10 be turned to the "off" position, but this and other usual features which are not shown and described are not part of my invention and not deemed necessary to full and complete understanding thereof.

My invention comprises the reconstruction of the meter casing 1 whereby the usual rectangular terminal compartment is omitted and a tubular projecting portion 14 is substituted therefor. The portion 14 is adapted to telescopically fit a similar tubular projecting portion 15 on the box casing 8. The tubular portion 14 is shown as integrally united with the meter casing 5, while the co-operating tubular portion 15 is shown as provided with a shoulder 16 against which the top wall 17 of the box casing 8 rests and is held in position, as by swaging over one end 18 of the tube 15.

Obviously, both of the tubular portions could be integral or swaged, as shown, or the portion 14 swaged to the casings and the portion integral with the casing 8, as desired. Adjacent annular ridges 20 and 21 may be formed on the tubular portions 14 and 15, respectively, for the reception of a transversely curved split ring 22 to hold the portions 14 and 15 together and thereby prevent breaking the connection between the meter and the box. Apertured outwardly projecting lugs 23 on the ring 22 provide for the reception of a screw, wing-nut, and washer sealed with a usual wire-and-solder sealing device 24.

The tubular portion 14 contains an insulating body or block 26 through which contact rods 27 extend. The rods may be provided with laterally-extending intermediate projections 28 to assist in holding the same firmly in the block 26 and may further be provided with inner terminal ends 30 and rounded outer ends 31. The ends 30 are for attachment to conducting leads connected to the meter coils (not shown).

The tubular portion 15 similarly contains an insulating block 33 in which tubular or other suitable conducting members 34 are embedded for the reception of the rods 27. The members 34 may be similarly provided with inner terminal ends 35 for connection to conductors connected to the switch and fuses (not shown).

Thus, the tubular portion 14, with its contents, constitutes a plug and the tubular portion 15, with its contents, constitutes a socket for co-operation therewith, so that, by a simple thrust motion, the meter may be quickly connected to its box, without the manipulation of a single terminal or conductor. When locked in place by the ring 22 and sealed by the seal 24, the meter and box are prevented from accidental and unauthorized separation.

As shown in Fig. 3, the tubular conducting members 34 in the tubular member 15 may be replaced by members 38 having laterally extended or curved openings 39 that are centered about the longitudinal axis of the portions 14 and 15, so that, when the rods 27 are inserted in position in the openings 39, the portions 14 and 15 and, consequently, the meter and the box may be turned relatively to each other by a considerable angular movement, without disturbing the electrical connection. Thus, discrepancies in the planes of the meter and box supports may be readily compensated and other desirable adjustments obtained.

While I have shown and described particular forms of my invention, changes may be effected therein without departing from the spirit and scope thereof, as set forth in the appended claims.

I claim as my invention:—

1. The combination with a unit including a meter mechanism and a casing therefor having a wall opening, and a unit including an element for cooperation with said mechanism and a casing for the element having a wall opening, of means for connecting said units by a thrust movement including thrust-contact members cooperating through said openings, one of said contact members being connected to said mechanism and another being connected to said element.

2. The combination with a unit including a meter mechanism and a casing therefor having a wall opening, and a unit including an element for cooperation with said mechanism and a casing for the element having a wall opening, of means for connecting said units by a thrust movement including thrust-contact members cooperating through said openings, one of said contact members being connected to said mechanism and another thereof being connected to said element, and conduit structure for preventing access to said contact members and to the interiors of said casings.

3. The combination with a unit including a meter mechanism and a casing therefor having a wall opening, and a unit including an element for cooperation with said mechanism and a casing for the element having a wall opening, of means comprising thrust-contact members for connecting said units for relative movement, one of said contact members being connected to said mechanism and another thereof being connected to said element, and cooperating portions associated with said casings around said openings to prevent access to said contact members and to the interiors of the casings.

4. The combination with a unit including a meter mechanism and a casing therefor having a wall opening, and a unit including an element for cooperation with said mechanism and a casing for the element having a wall opening, one of said casings having a tubular portion projecting therefrom around the said opening therein, of means for connecting said units by a thrust movement along a common axis through said openings and said tubular portion including thrust-contact members cooperating through said tubular portion, one of said contact members being connected to said mechanism and another thereof being connected to said element, said casings being spaced apart in operative connected position and said tubular portion constituting a conduit for preventing access to said contact members and to the interiors of said casings.

5. The combination with a unit including a meter mechanism and a casing therefor having a wall opening, and a unit including an element for cooperation with said mechanism and a casing for the element having a wall opening, each of said casings having a tubular portion projecting therefrom around the said opening therein and adapted for telescopic relation to the other tubular portion, of means for connecting said units by a thrust movement along a common axis through said tubular portions to telescopically connect the latter and including thrust contact members coöperating through said tubular portions, one of said contact members being connected to said mechanism and another thereof being connected to said element.

6. The combination with a unit comprising a meter-mechanism casing, a unit including an element for cooperation with said meter mechanism, and a passage-forming structure securing said units together, of separable contact members connected, respectively, to said meter mechanism and to said element, one of said contact members being rigid and disposed within said passage-forming structure.

7. The combination with a unit comprising a meter-mechanism casing, a unit including an element for cooperation with said meter mechanism, and a passage-forming structure comprising detachable members securing said units together, of separable contact members connected, respectively, to said meter mechanism and to said element, one of said contact members being rigid and disposed within said passage-forming structure.

8. The combination with a unit comprising a meter-mechanism casing, a unit including an element for cooperation with said meter mechanism, and a passage-forming structure comprising detachable members securing said units together, of separable contact members connected, respectively, to said meter mechanism and to said element, both of said contact members being rigid and telescopically engaging each other within said passage-forming structure.

9. The combination with a unit comprising a meter-mechanism casing, a unit including an element for cooperation with said meter mechanism, and a passage-forming structure comprising detachable members securing said units together, of separable contact members connected, respectively, to said meter mechanism and to said element, both of said contact members being rigid and telescopically engaging each other within said passage-forming structure, and insulating material disposed around said contact members and within said passage-forming structure.

10. The combination with a unit comprising a meter-mechanism casing, a unit including an element for cooperation with said meter mechanism, and a passage-forming structure comprising detachable members securing said units together, of separable contact members connected, respectively, to said meter mechanism and to said element, one of said contact members comprising an elongated passage for connecting said units for relative angular movement.

11. The combination with a unit comprising a meter-mechanism casing having a conduit projecting therefrom, and a unit including an element for cooperation with said mechanism, of means comprising thrust-contact members for connecting said units by a thrust movement, one of said contact members being connected to said mechanism and another being connected to said element, said conduit projecting toward said second-named unit and receiving said one of said contact members.

12. The combination with a unit comprising a meter-mechanism casing having a conduit projecting therefrom, and a unit including an element for cooperation with said meter mechanism, said last-named unit having a conduit in alinement with said first-named conduit and connected thereto, of means comprising thrust-contact members for connecting said units by a thrust movement, one of said contact members being connected to said meter mechanism and another being connected to said element.

13. The combination with an encased electric meter having electrical contact pins secured to and projecting from the casing thereof, of an element for cooperation with said meter casing having contact sockets carried thereby and disposed to receive said contact pins, and cooperating means on said element and casing for detachably securing said casing and element in operative relation.

14. In combination, an encased electrical instrument having electrical contacts secured to the casing thereof, an element for cooperation with said instrument including contacts disposed to telescopically cooperate with said instrument contacts, and cooperating means on said instrument casing and element for detachably securing said casing and element in operative relation and for completely enclosing said contacts.

15. In combination, an encased electric meter, contact pins projecting from the casing thereof, and means carried by said casing for surrounding said contact pins, an element for cooperation with said meter including contact sockets and means surrounding said sockets, said contacts and means surrounding them being proportioned to telescopically cooperate to constitute a separable connection between the meter casing and element.

In testimony whereof, I have hereunto subscribed my name this 6th day of August, 1925.

HARRY P. SPARKES.